United States Patent
Brindley et al.

(10) Patent No.: US 11,055,483 B2
(45) Date of Patent: Jul. 6, 2021

(54) METHODS AND SYSTEMS FOR IMPROVING DESIGNS OF ELECTRONIC MAIL MESSAGE TEMPLATES

(71) Applicant: Litmus Software, Inc., Cambridge, MA (US)

(72) Inventors: Matthew James Brindley, Boston, MA (US); Brendan Caffrey, Somerville, MA (US); Gary John Heslop, Runcorn (GB); Albert Andrus Lamb, Exeter, NH (US)

(73) Assignee: Litmus Software, Inc., Cambridge, MA (US)

( * ) Notice: Subject to any disclaimer, the term of this patent is extended or adjusted under 35 U.S.C. 154(b) by 0 days.

(21) Appl. No.: 16/814,194

(22) Filed: Mar. 10, 2020

(65) Prior Publication Data

US 2020/0387665 A1    Dec. 10, 2020

Related U.S. Application Data

(60) Provisional application No. 62/857,892, filed on Jun. 6, 2019.

(51) Int. Cl.
*G06F 40/186* (2020.01)
*G06F 40/143* (2020.01)

(52) U.S. Cl.
CPC .......... *G06F 40/186* (2020.01); *G06F 40/143* (2020.01)

(58) Field of Classification Search
CPC .................................................. G06F 40/186
See application file for complete search history.

(56) References Cited

U.S. PATENT DOCUMENTS 9,003,423 B1 *  4/2015  Rodriguez Valadez .. G06F 9/54
                                                           719/310
9,262,396 B1 *  2/2016  Rodriguez Valadez ....................
                                                           G06F 40/194

(Continued)

FOREIGN PATENT DOCUMENTS

JP    2005190269 A    7/2005
WO   2020247039 A1   12/2020

OTHER PUBLICATIONS

International Search Report & Written Opinion dated Jun. 30, 2020 by the International Search Authority for PCT/US2020/021973, 10 pages.

*Primary Examiner* — Asher D Kells
(74) *Attorney, Agent, or Firm* — Blueshift IP, LLC; Cynthia M. Gilbert (57) ABSTRACT

A method for improving designs of electronic message templates based on identified variations includes importing, by a capture engine executing on a first computing device, an email template into an email client. The method includes rendering the email template in the email client. The method includes generating a screen shot of a portion of the rendered email template. The method includes comparing, by a comparison engine, the generated screen shot with an archived screen shot of the rendered portion. The method includes determining that a first level of variation between the generated screen shot and the archived screen shot exceeds a first threshold level of variation. The method includes transmitting, by an alert engine executed by the first computing device, to a second computing device, a notification of the first level of variation and a recommendation to modify the email template to minimize the first level of variation.

10 Claims, 8 Drawing Sheets

(56) References Cited

U.S. PATENT DOCUMENTS

| | | |
|---|---|---|
| 2005/0188357 A1 | 8/2005 | Derks |
| 2006/0170705 A1* | 8/2006 | Wilson ................. G06Q 10/107 345/628 |
| 2010/0070850 A1 | 3/2010 | Yamaji |
| 2010/0211893 A1* | 8/2010 | Fanning .................... G06F 8/38 715/760 |
| 2011/0093773 A1* | 4/2011 | Yee ..................... G06F 16/9577 715/235 |
| 2012/0051634 A1* | 3/2012 | Chong ................. G06K 9/4652 382/165 |
| 2012/0084354 A1* | 4/2012 | Shinomoto ........... G06F 3/1462 709/203 |
| 2012/0243745 A1 | 9/2012 | Amintafreshi |
| 2013/0004087 A1 | 1/2013 | Kumar |
| 2015/0121184 A1* | 4/2015 | Steinmann ............. G06Q 30/02 715/205 |
| 2019/0164449 A1* | 5/2019 | Kems ................ G06K 9/00463 |

* cited by examiner

METHODS AND SYSTEMS FOR IMPROVING DESIGNS OF ELECTRONIC MAIL MESSAGE TEMPLATES

CROSS-REFERENCE TO RELATED APPLICATIONS

This application claims priority from U.S. Provisional Patent Application No. 62/857,892, filed on Jun. 6, 2019, entitled, "Methods and Systems for Improving Designs of Electronic Mail Message Templates," which is hereby incorporated by reference.

BACKGROUND

The disclosure relates to improving electronic mail (email) message templates. More particularly, the methods and systems described herein relate to functionality for monitoring for and identifying variations in user interface designs and making recommendations for improving designs of electronic message templates based on identified variations.

Conventional systems allow users to generate templates that can be automatically populated with data and sent as emails to recipients viewing the emails through a variety of email applications. However, many email applications are hosted by third parties who can and do change how their systems render email messages without notice to message senders or recipients. There is a need for functionality that determines whether such a change has occurred and inform email senders that their templates may no longer render messages as expected.

BRIEF SUMMARY

In one aspect, a method for monitoring for and identifying variations in user interface designs and making recommendations for improving designs of electronic message templates based on identified variations includes importing, by a capture engine executing on a first computing device, an email template into an email client. The method includes rendering, by the capture engine, the email template in the email client. The method includes generating, by the capture engine, a screen shot of a portion of the rendered email template. The method includes comparing, by a comparison engine executed by the first computing device, the generated screen shot with an archived screen shot of the portion of the rendered email template. The method includes determining, by the comparison engine, that a first level of variation between the generated screen shot and the archived screen shot exceeds a first threshold level of variation. The method includes transmitting, by an alert engine executed by the first computing device, to a second computing device, a notification of the first level of variation and a recommendation to modify the email template to minimize the first level of variation.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The present disclosure relates to methods and systems for improving designs of electronic mail message templates.

Figure 1A:
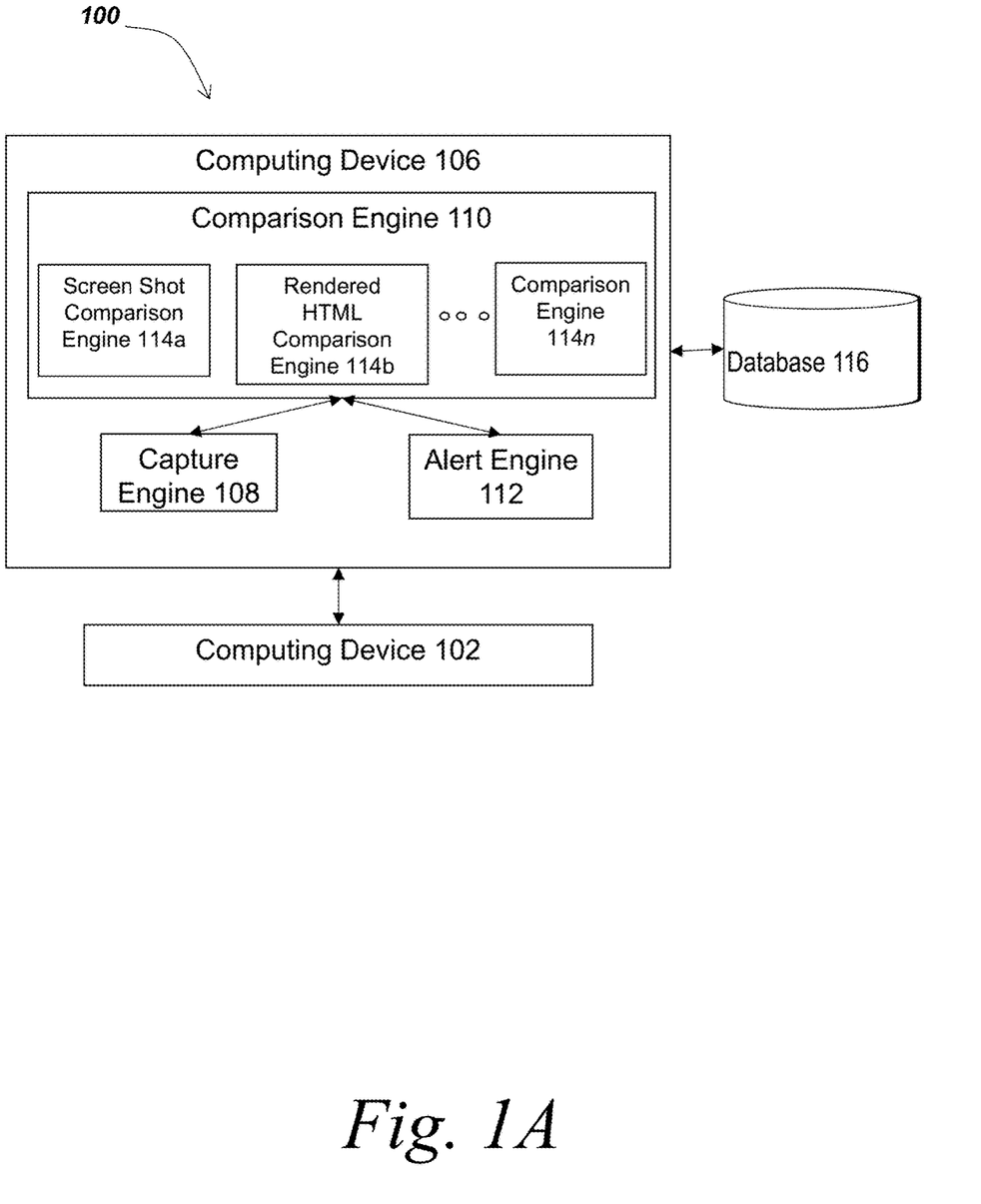
FIG. 1A is a block diagram depicting an embodiment of a system for improving designs of electronic mail message templates.

Referring now to FIG. 1A, a block diagram depicts one embodiment of a system 100 for monitoring for and identifying variations in user interface designs and making recommendations for improving designs of electronic mail (email) message templates based on identified variations. The system 100 includes a first computing device 106, a second computing device 102, a capture engine 108, a comparison engine no, an alert engine 112, comparison engines 114a-n (including a screen shot comparison engine 114a and a rendered HyperText Markup Language (HTML) comparison engine 114b), and a database 116.

Figure 1B:
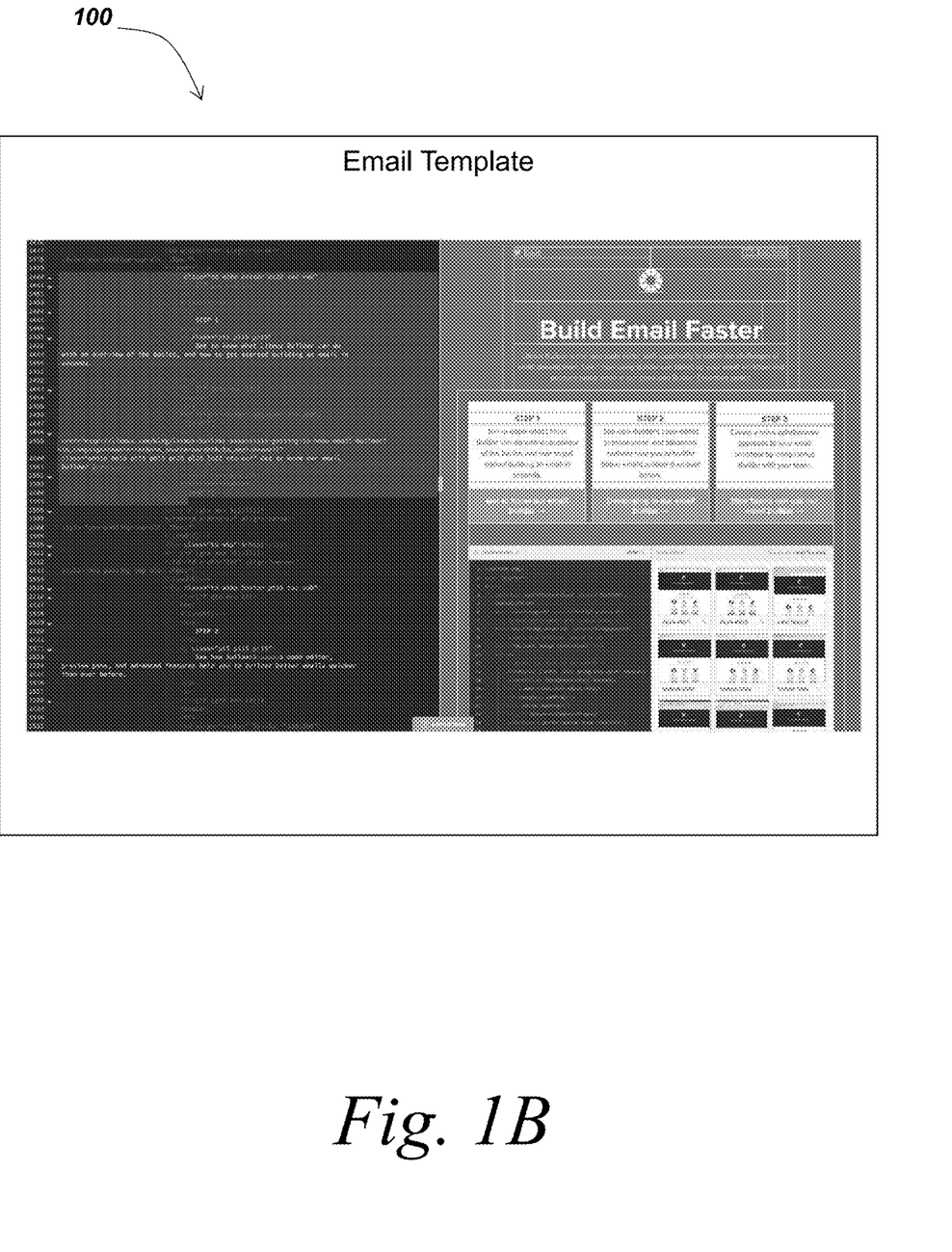
FIG. 1B is a block diagram depicting one embodiment of an email template.

The email message template may be an HTML document. The email message template may be a document designed by a user of the system 100. The email message template may be a document provided by the system 100 for users. Email message templates, as will be understood by those of ordinary skill in the art, may be used to send core messages out to a plurality of users with minimal customization instead of manually generating and sending individual messages to individual users (e.g., templates providing welcome messages, password resets, etc.). Referring ahead to FIG. 1B, a block diagram depicts one embodiment of an email template. As shown in FIG. 1B, the email template may be rendered in an email client and may have an associated HTML document; for example, the HTML document may provide instructions for rendering the email template in the email client.

Referring back to FIG. 1A, some embodiments, the capture engine 108 is a software program. In other embodiments, the capture engine 108 is a hardware module. The capture engine 108 may include functionality for executing scripts. The capture engine 108 may include functionality for generating and sending email messages. The capture engine 108 may include functionality for executing an email application, opening an email message within the email application, and generating a screen shot of the opened email message (e.g., generating a digital image representing a rendering of the email message by the email application).

In some embodiments, the comparison engine 110 is a software program. In other embodiments, the comparison engine 110 is a hardware module. The comparison engine 110 may execute on the first computing device. The comparison engine 110 may include functionality for comparing the contents of digital image files. The comparison engine 110 may include functionality for comparing two or more text documents including, by way of example, two or more documents written in HyperText Markup Language (HTML).

In some embodiments, the comparison engine 110 includes a plurality of engine components, each of which provides functionality for executing different types of comparisons. As shown in FIG. 1, the comparison engine 110 includes a screen shot comparison engine 114a and a rendered HTML comparison engine 114b.

In some embodiments, the screen shot comparison engine 114a is a software program. In other embodiments, the screen shot comparison engine 114a is a hardware module. The screen shot comparison engine 114a may include functionality for comparing the contents of digital image files.

In some embodiments, the rendered HTML comparison engine 114b is a software program. In other embodiments, the rendered HTML comparison engine 114b is a hardware module. The rendered HTML comparison engine 114b may include functionality for comparing two or more HTML documents (e.g., two or more text documents including HTML code).

In some embodiments, the alert engine 112 is a software program. In other embodiments, the alert engine 112 is a hardware module. The alert engine 112 may execute on the first computing device. The alert engine 112 may include one or more rules for use in generating and sending notifications. The alert engine 112 may include functionality for extracting user contact information associated with an email template. The alert engine 112 may include functionality for generating and sending a message to a creator of an email template using extracted user contact information.

In some embodiments, the database 116 is an ODBC-compliant database. For example, the database 116 may be provided as an ORACLE database, manufactured by Oracle Corporation of Redwood Shores, Calif. In other embodiments, the database 116 can be a Microsoft ACCESS database or a Microsoft SQL server database, manufactured by Microsoft Corporation of Redmond, Wash. In other embodiments, the database 116 can be a SQLite database distributed by Hwaci of Charlotte, N.C., or a PostgreSQL database distributed by The PostgreSQL Global Development Group. In still other embodiments, the database 116 may be a custom-designed database based on an open source database, such as the MYSQL family of freely available database products distributed by MySQL AB Corporation of Uppsala, Sweden. In other embodiments, examples of databases include, without limitation, structured storage (e.g., NoSQL-type databases and BigTable databases), HBase databases distributed by The Apache Software Foundation of Forest Hill, Md., MongoDB databases distributed by 10Gen, Inc., of New York, N.Y., an AWS DynamoDB distributed by Amazon Web Services and Cassandra databases distributed by The Apache Software Foundation of Forest Hill, Md. In further embodiments, the database 116 may be any form or type of database.

Figure 2:
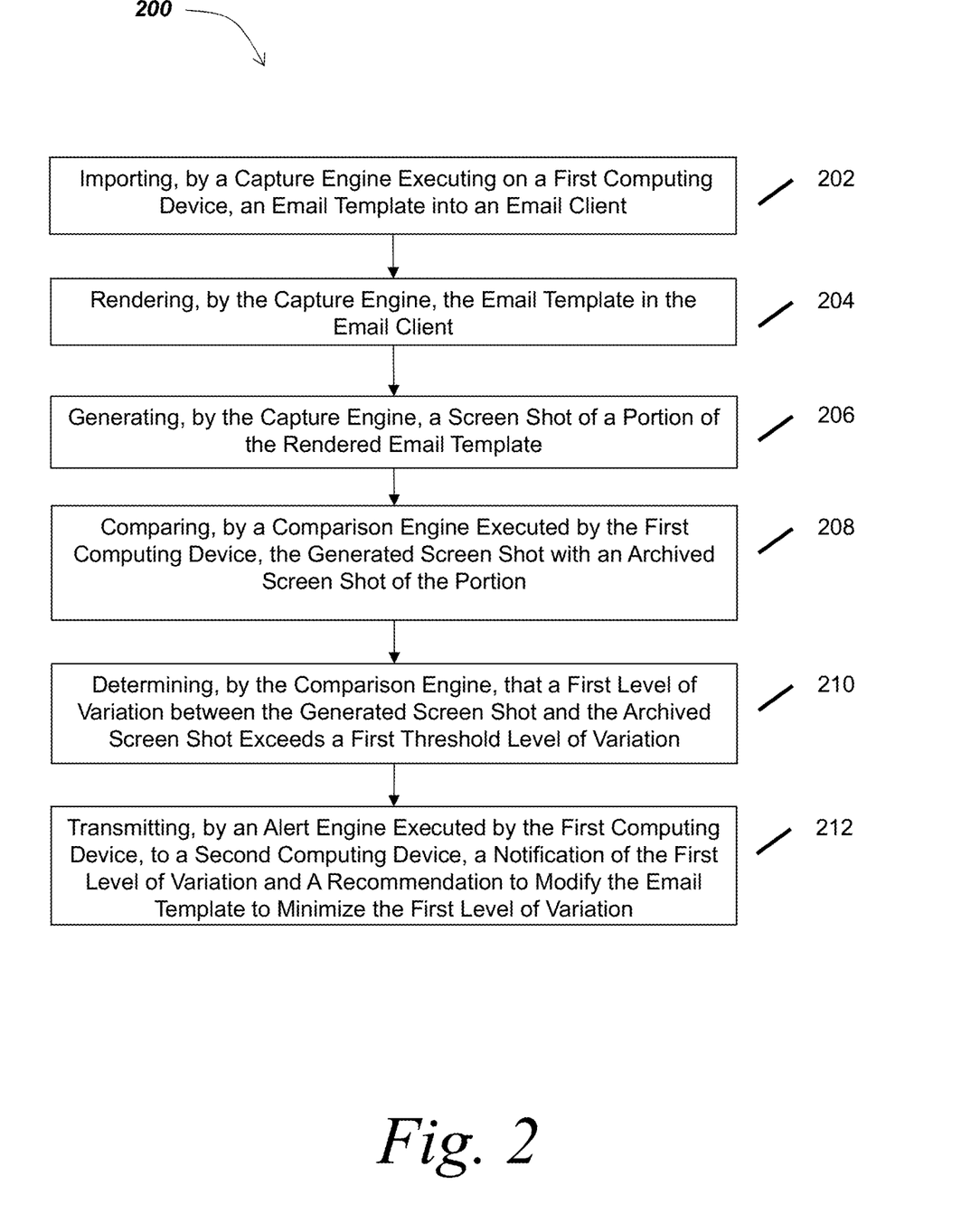
FIG. 2 is a flow diagram depicting an embodiment of a method for improving designs of electronic mail message templates.

Referring now to FIG. 2, a flow diagram depicts one embodiment of a method 200 for monitoring for and identifying variations in user interface designs and making recommendations for improving designs of email message templates based on identified variations. In brief overview, the method 200 includes importing, by a capture engine executing on a first computing device, an email template into an email client (202). The method 200 includes rendering, by the capture engine, the email template in the email client (204). The method 200 generating, by the capture engine, a screen shot of a portion of the rendered email template (206). The method 200 includes comparing, by a comparison engine executed by the first computing device, the generated screen shot with an archived screen shot of the rendered portion (208). The method 200 includes determining, by the comparison engine, that a first level of variation between the generated screen shot and the archived screen shot exceeds a first threshold level of variation (210). The method 200 includes transmitting, by an alert engine executed by the first computing device, to a second computing device, a notification of the first level of variation and a recommendation to modify the email template to minimize the first level of variation (212).

In some embodiments, prior to execution of the method 200, the system 100 receives a request for monitoring for variations in rendering of email templates by one or more email rendering clients. In one of these embodiments, the method 200 includes receiving, by the first computing device 106, from a second computing device 102, before importing the email template, a request from the second computing device 102 to monitor for variations in rendering of the email template by at least one email client.

Referring now to FIG. 2 in greater detail and in connection with FIGS. 1A-B, the method 200 includes importing, by a capture engine executing on a first computing device, an email template into an email client (202). In some embodiments, a designer of the email template emails the email template to an email address (e.g., a dedicated email address assigned to the designer) and the capture engine 108 access an email account of the email address and imports received email templates (e.g., by executing a script to log into the email account upon receiving a notification that a new email has been received and then downloading a copy of the email template). In other embodiments, a designer of the email template designs the email template within a user interface provided by the system 100 (not shown) and the user interface provides functionality for storing the email template at a location accessible to the capture engine 108; the capture engine 108 may poll the location to determine whether a new email template is available or register for notifications when new email templates become available. In still other embodiments, a designer of the email template may access a user interface provided by the system 100 (not shown) to provide a copy of the email template directly to the capture engine 108.

Figure 1C:
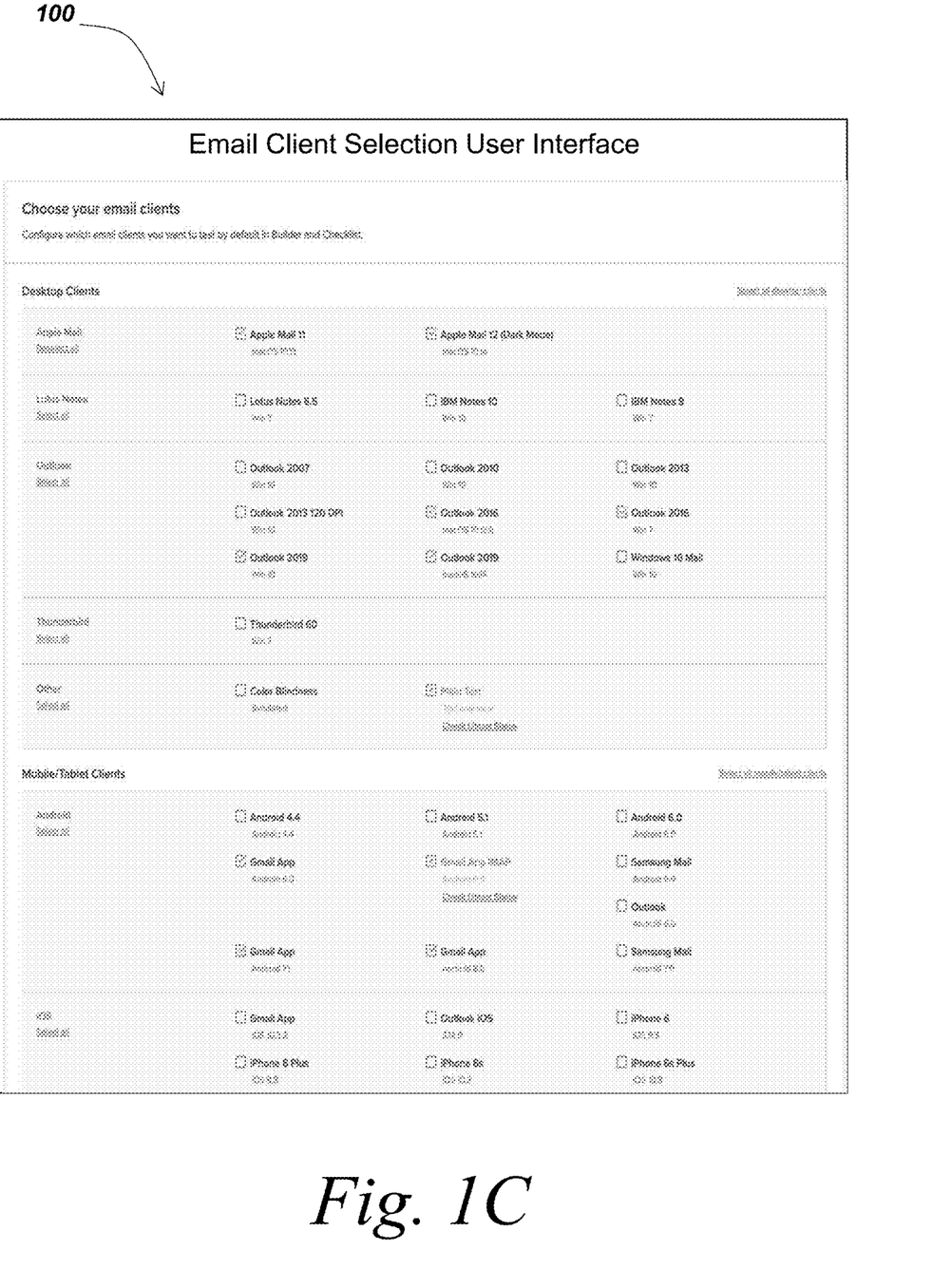
FIG. 1C is a block diagram depicting one embodiment of a user interface in a system for improving designs of electronic mail message templates.

In some embodiments, and as shown in FIG. 1C, the method 200 includes displaying a user interface with which a user may select one or more email clients with which the system 100 should monitor for design variances.

Referring back to FIG. 2, the method 200 includes rendering, by the capture engine, the email template in the email client (204). In some embodiments, the capture engine 108 automatically executes at least one script to send an email message to a test email account, launch the email client being monitored for variances, find the sent email message, and open the email message. In some embodiments, the at least one script is a run-time software component; such a component may be invoked based upon a preference associated with an email template (e.g., whether a user creating or maintaining the email template requested execution of the methods described herein and whether the user identified one or more email clients with which the system should test the email template).

The method 200 generating, by the capture engine, a screen shot of a portion of the rendered email template (206). In some embodiments, a "screen shot" may be referred to as "an email capture." A "screen shot of a portion of the rendered email template" or "an email capture" may refer to a static image file generated by a computer displaying an email rendered by an email client on a particular operating system and device. As will be understood by those of ordinary skill in the art, a screen shot is a static image file generated by a computer and containing a representation of what is being rendered by the computer on a display at the time the file is generated. In some embodiments, the capture engine 108 executes a script that executes a command to generate a screen shot of at least a portion of the email message as rendered in the email client.

In some embodiments, the capture engine 108 generates a screen shot of the entire rendered portion of the email template. In other embodiment, the capture engine 108 generates a screen shot of a portion of the rendered portion of the email template. In still other embodiments, the capture engine 108 generates a screen shot of a cross section of the rendered email template.

In some embodiments, the capture engine 108 modifies a screen shot of the rendered portion of the email template. For example, the capture engine 108 may execute functionality for cropping a screen shot to remove whitespace on the edge of the image. As another example, the capture engine 108 execute functionality for cropping a screen shot to reduce the size of the image; for example, by identifying a minimum bounding rectangle and cropping to the size of that rectangle.

The method 200 includes comparing, by a comparison engine executed by the first computing device, the generated screen shot with an archived screen shot of the rendered portion (208). The archived screen shot may be referred to as a control version of the email template. In one embodiment, the comparison engine 110 retrieves the control version of the email template from the database 116. In another embodiment, the capture engine 108 retrieves the control version of the email template from the database 116 and transmits the retrieved control version to the comparison engine 110.

In one embodiment, the comparison engine 110 compares the entire generated screen shot with the entire control version of the email template. In another embodiment, the comparison engine compares a subset of a plurality of pixels in the generated screen shot with a subset of a plurality of pixels the archived screen shot.

In one embodiment, the comparison engine 110 executes a binary comparison of the two screen shots. In another embodiment, the comparison engine 110 executes a size comparison of the two screen shots. In still another embodiment, the comparison engine 110 executes an RBG projection and relative luminance comparison of the two screen shots. In yet another embodiment, the comparison engine 110 performs a pixel-by-pixel comparison of the two images. In a further embodiment, the comparison engine 110 identifies a region of interest in the generated screen shot; identifies a corresponding region of interest in the archived screen shot; and compares the region of interest in the generated screen shot with the corresponding region of interest in the archived screen shot. In some embodiments, the comparison engine 110 selects one technique for determining the level of variation between the two screen shots. In other embodiments, the comparison engine 110 applies all available techniques for determining the level of variation between the two screen shots.

The method 200 includes determining, by the comparison engine, that a first level of variation between the generated screen shot and the archived screen shot exceeds a first threshold level of variation (210). In one embodiment, the comparison engine 110 determines the level of variation based upon the comparing of the generated screen shot with the archived screen shot. The comparison engine 110 may receive a level of variation as a result of performing a comparison between the generated screen shot and the archived screen shot. The comparison engine 110 may determine that the level of variation exceeds the first threshold level of variation. A user of the system 100 may specify the level of variation acceptable for a particular email template; for example, the system 100 may include a user interface (not shown) with which the user of the system 100 may specify the level of variation (e.g., by selecting on pre-defined options or entering a value for the level of variation).

In some embodiments, the comparison engine 110 determines that the level of variation exceeds the threshold by an amount that is associated with an instruction to transmit an alert or other notification to the second computing device 102. In one of these embodiments, the comparison engine 110 transmits, to the alert engine 112, an instruction to generate and transmit the notification.

The method 200 includes transmitting, by an alert engine executed by the first computing device, to a second computing device, a notification of the first level of variation and a recommendation to modify the email template to minimize the first level of variation (212). In some embodiments, the alert engine 112 transmits a notification that a user of the second computing device 102 should access an account with which the email template was designed to view a comparison between the archived screen shot and the generated screen shot.

In some embodiments, the alert engine 112 transmits the notification during the design of the email template. The system 100 may receive a notification from a user designing the email template that the user is to be alerted to levels of variation in the rendering of the email template during the process of designing the email template. Therefore, the capture engine 108 may import incomplete or draft versions of the email template during the process of designing the email template and the method 200 may execute with renderings of the incomplete or draft versions of the email template as described above. The alert engine 112 may then provide email notifications or in-app messages or in-app alerts to the user during the design process (e.g., at each point in time at which the user has requested execution of the method 200 or at each point in time at which the email template is modified).

In some embodiments, the comparison engine 110 stores, in a log, an identification of the level of variance. In other embodiments, the comparison engine 110 stores, in a log, an identification of the transmitted notification. The comparison engine 110 may store, in a log, an identification of the results of the comparison.

The method 200 may include execution of a different comparison engine, such as in embodiments in which the comparison engine 110 includes multiple different engines 114a-n, each of which may be capable of comparing different aspects of the email template. In one embodiment, the comparison engine 110 includes functionality for determining whether an HTML document associated with (and, in some instances, underlying) the email template has been changed by the email client and, if so, whether the changes exceed a second threshold level of variance. Therefore, the method 200 may include rendering, by the capture engine, in the email client, an HTML document associated with the email template. The method 200 may include comparing the rendered HTML document with an archived HTML document associated with the email template. The method 200 may include determining, by the comparison engine 110 (and, in particular, by a second comparison engine 114b), that a second level of variation between the rendered HTML document and the archived HTML document exceeds a second threshold level of variation. The method 200 may include transmitting, by the alert engine, to the second computing device, a second notification of the level of variation and a second recommendation to modify the email template to minimize the level of variation. The method 200 may include transmitting, by the alert engine 112, an indication of the section(s) of the HTML document that contributed to the second level of variance. Therefore, the method 200 may include programmatically entering an email template into one or more test email accounts in one or more email clients; executing a series of automation scripts to log in to the email accounts, open the email, and screen shot the email as it is rendered in each of the email clients; programmatically obtaining the rendered HTML (because each email client may alter the original HTML at render time, this rendered HTML may vary, even slightly, from the original HTML); and storing copies of the screen shots and rendered HTML in a data store.

In embodiments in which the method 200 includes determining multiple levels of variance (e.g., a first level of variance for variations between screen shots and a second level of variance for variations between HTML documents), the method 200 may include transmitting a notification for each level of variance determined to exceed an associated threshold level of variance—that is, if the screen shots differ by an amount that exceeds a first threshold and the HTML documents differ by an amount that exceeds a second threshold, the method 200 may send two notifications, one for each threshold exceeded. Alternatively, in other embodiments, the method 200 may include combining a first level of variance and a second level of variance and determining whether the combined level of variance exceeds a third threshold level of variance.

In some embodiments, the comparison engine 110 includes only the screen shot comparison engine 114a and not the other comparison engines 114b-n. In other embodiments, the comparison engine 110 includes only the rendered HTML comparison engine 114b and not the other comparison engines 114a or 114n. In further embodiments, the comparison engine no includes only the screen shot comparison engine 114a and the rendered HTML comparison engine 114b and not any other comparison engines 114n.

Figure 3:
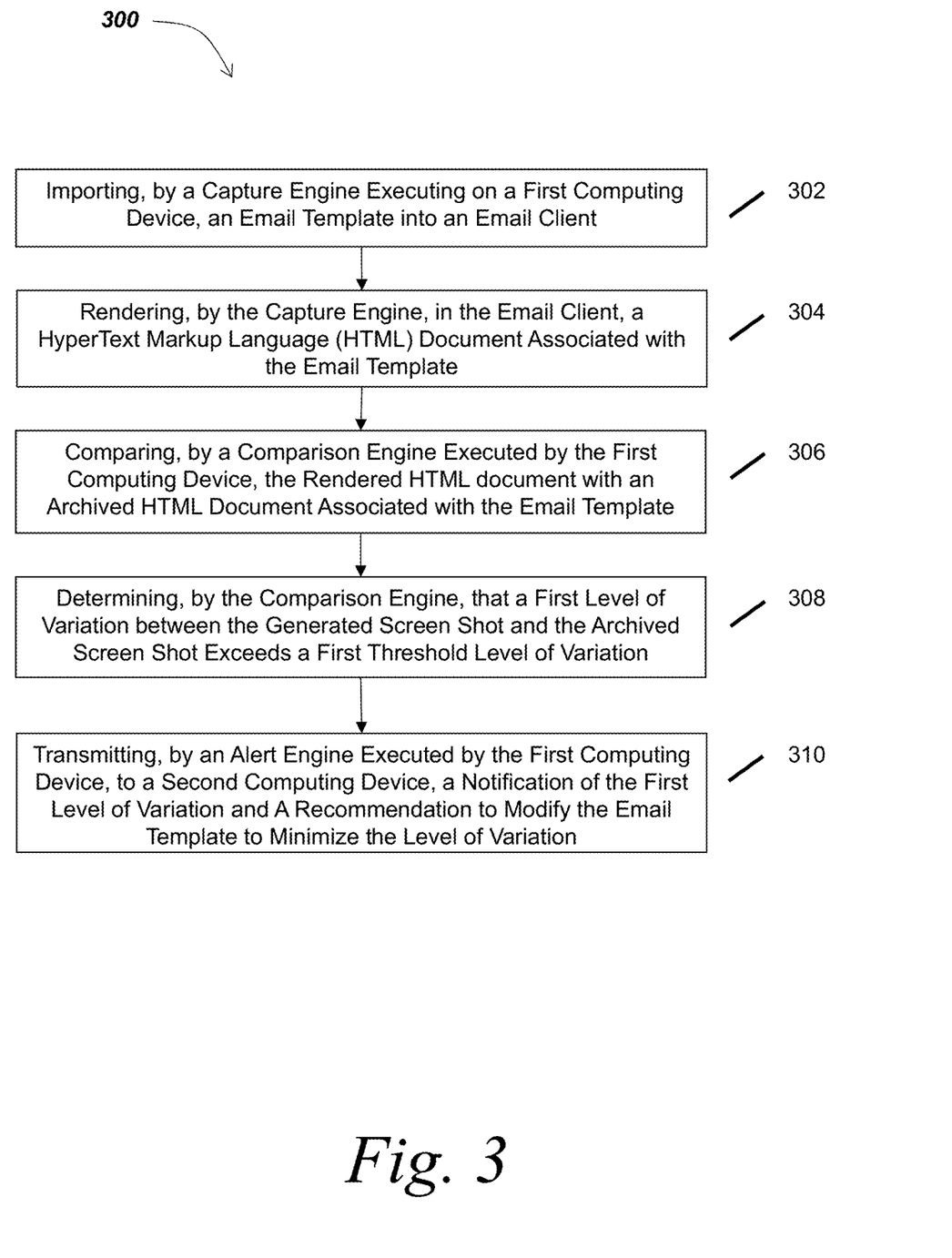
FIG. 3 is a flow diagram depicting an embodiment of a method for improving designs of electronic mail message templates.

Referring now to FIG. 3, a flow diagram depicts one embodiment of a method 300 for monitoring for and identifying variations in user interface designs and making recommendations for improving designs of electronic message templates based on identified variations. In brief overview, the method 300 includes importing, by a capture engine executing on a first computing device, an email template into an email client (302). The method 300 includes rendering, by the capture engine, a HyperText Markup Language (HTML) document associated with the email template in the email client (304). The method 300 includes comparing, by a comparison engine executed by the first computing device, the rendered HTML document with an archived HTML document associated with the email template (306). The method 300 includes determining, by the comparison engine, that a first level of variation between the rendered HTML document and the archived HTML document exceeds a first threshold level of variation (308). The method 300 includes transmitting, by an alert engine executed by the first computing device, to a second computing device, a notification of the first level of variation and a recommendation to modify the email template to minimize the first level of variation (310). As will be understood by those of ordinary skill in the art, the method 300 may include the steps of method 200, thus including rendering, by the capture engine, the email template in the email client; generating, by the capture engine, a screen shot of a portion of the rendered email template; comparing, by a second comparison engine executed by the first computing device (e.g., the comparison engine 114a), the generated screen shot with an archived screen shot of the rendered portion; determining, by the comparison engine, that a second level of variation between the generated screen shot and the archived screen shot exceeds a second threshold level of variation; and transmitting, by the alert engine, to the second computing device, a notification of the second level of variation and a second recommendation to modify the email template to minimize the second level of variation.

Although described above as a level of variation, one of ordinary skill in the art will understand that the comparison engine 110 may execute functionality to determine a level of similarity between the generated screen shot and the archived screen shot and determine that the level of similarity fails to meet a threshold level of similarity.

In some embodiments, the comparison engine 110 stores the generated screen shot in the database 116. In one of these embodiments, the comparison engine 110 replaces the archived screen shot with the generated screen shot and the generated screen shot will be used as the control screen shot in a subsequent comparison process.

The system 100 may repeat the execution of the method 200 with each of a plurality of email clients. The system 100 may repeat the execution of the method 200 at configurable time intervals.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure, possibly in combination with other embodiments of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PYTHON, PROLOG, PERL, C, C++, C #, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
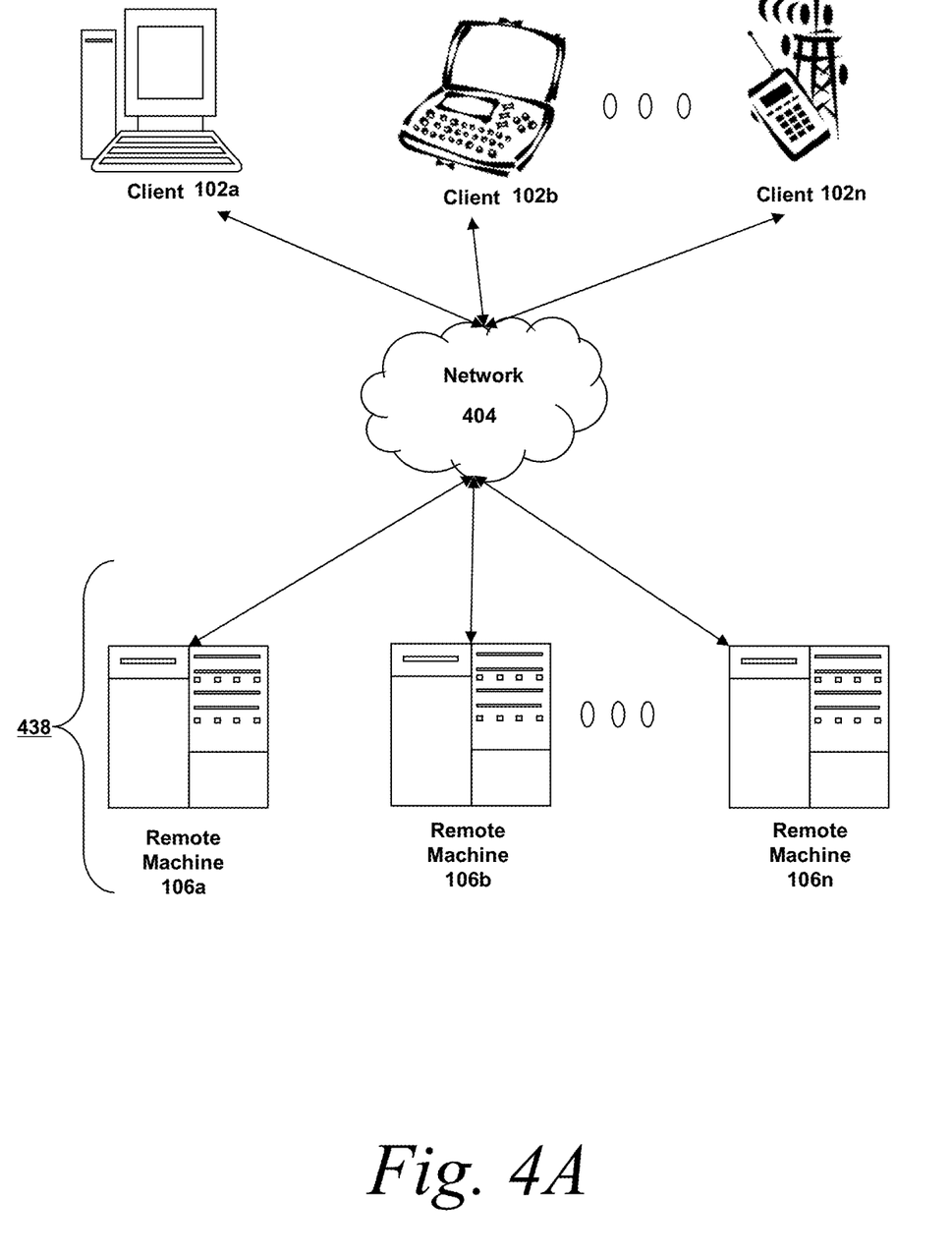
FIGS. 4A-4C are block diagrams depicting embodiments of computers useful in connection with the methods and systems described herein.
Figure 4B:
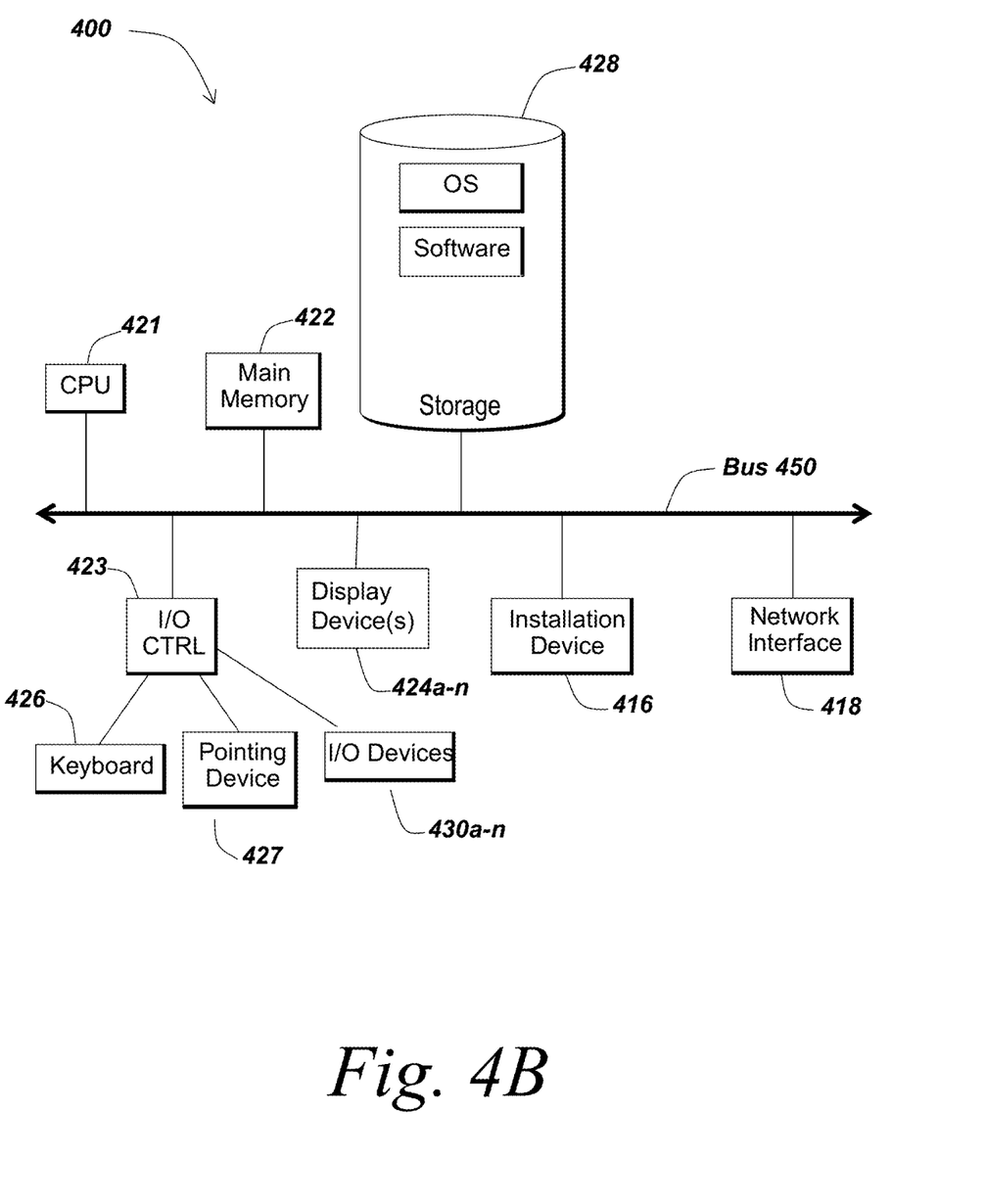
Figure 4C:
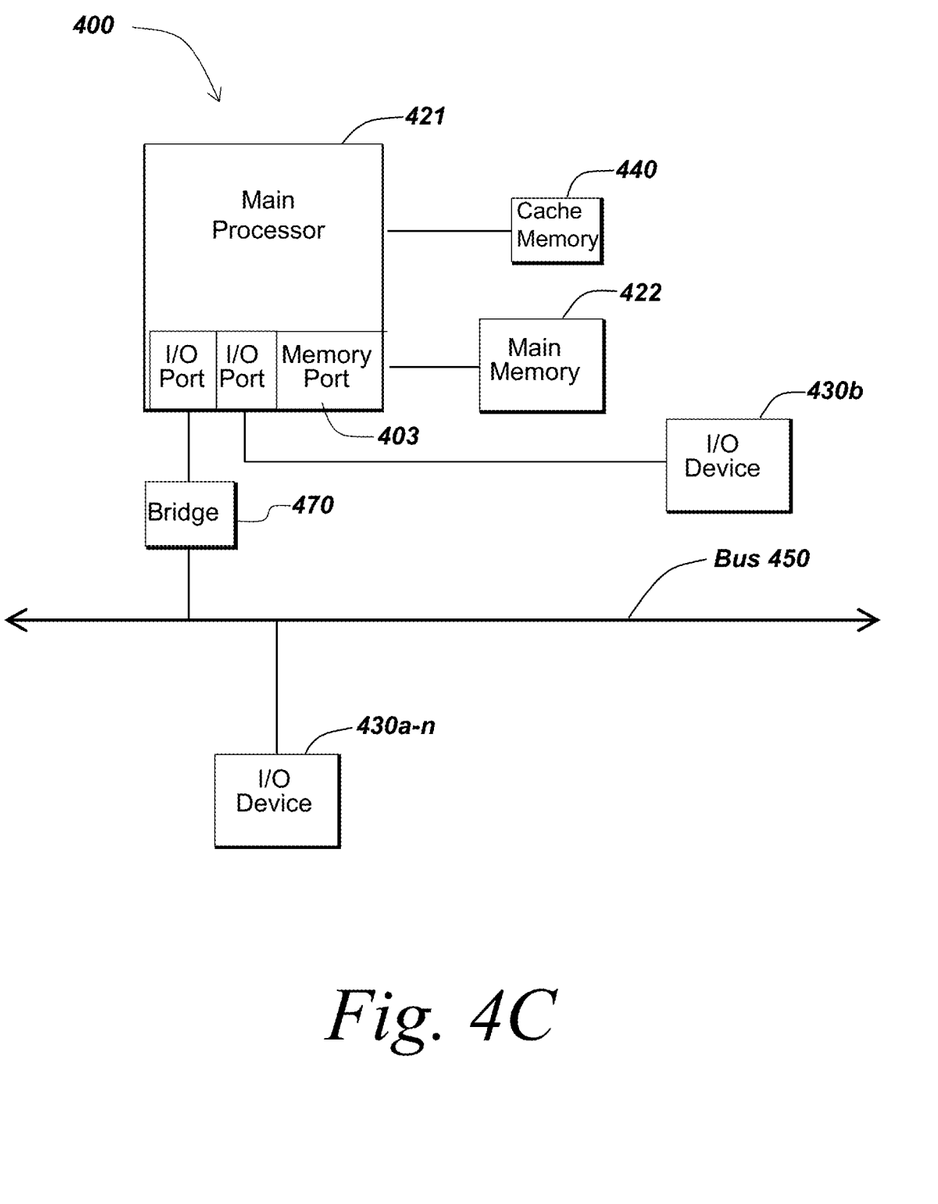

Referring now to FIGS. 4A, 4B, and 4C, block diagrams depict additional detail regarding computing devices that may be modified to execution functionality for implementing the methods and systems described above.

Referring now to FIG. 4A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 404.

Although FIG. 4 shows a network 404 between the client(s) 102 and the remote machines 106, the client(s) 102 and the remote machines 106 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the client(s) and the remote machines 106. In one of these embodiments, a network 404' (not shown) may be a private network and a network 404 may be a public network. In another of these embodiments, a network 404 may be a private network and a network 404' a public network. In still another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network 404 may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client(s) 102 and a remote machine 106 (referred to generally as computing devices 400) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client(s) 102 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client(s) 102.

In one embodiment, a computing device 106 provides functionality of a web server. In some embodiments, a web server 106 comprises an open-source web server, such as the NGINX web servers provided by NGINX, Inc., of San Francisco, Calif., the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm 438. In another of these embodiments, the server farm 438 may be administered as a single entity.

FIGS. 4B and 4C depict block diagrams of a computing device 100 useful for practicing an embodiment of the client(s) 102 or a remote machine 106. As shown in FIGS. 4B and 4C, each computing device 100 includes a central processing unit 421, and a main memory unit 422. As shown in FIG. 4B, a computing device 400 may include a storage device 428, an installation device 416, a network interface 418, an I/O controller 423, display devices 424a-n, a keyboard 426, a pointing device 427, such as a mouse, and one or more other I/O devices 430a-n. The storage device 428 may include, without limitation, an operating system and software. As shown in FIG. 4C, each computing device 400 may also include additional optional elements, such as a memory port 403, a bridge 470, one or more input/output devices 430a-n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 400 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 321 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 also communicates directly with an I/O device 430b via, for example, HYPERTRANSPORT, RAPIDIO, or INFINIBAND communications technology.

One or more of a wide variety of I/O devices 430a-n may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, Calif.

Referring still to FIG. 4B, the computing device 400 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 400 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In further embodiments, an I/O device 430 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.1-4.0, WINDOWS CE, WINDOWS XP, WINDOWS 7, WIN- DOWS 8, WINDOWS VISTA, and WINDOWS 10, all of which are manufactured by Microsoft Corporation of Redmond, Wash.; any version of MAC OS manufactured by Apple Inc. of Cupertino, Calif.; OS/2 manufactured by International Business Machines of Armonk, N.Y.; Red Hat Enterprise Linux, a Linus-variant operating system distributed by Red Hat, Inc., of Raleigh, N.C.; Ubuntu, a freely-available operating system distributed by Canonical Ltd. of London, England; or any type and/or form of a Unix operating system, among others.

The computing device 400 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments, the computing device 400 is a mobile device, such as a JAVA-enabled cellular telephone/smartphone or personal digital assistant (PDA). The computing device 400 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 100 is a smartphone, POCKET PC, POCKET PC PHONE, or other portable mobile device supporting Microsoft Windows Mobile Software.

In some embodiments, the computing device 400 is a digital audio player. In one of these embodiments, the computing device 400 is a digital audio player such as the Apple IPOD, IPOD TOUCH, IPOD NANO, and IPOD SHUFFLE lines of devices manufactured by Apple Inc. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J., or Creative Technologies Ltd. of Singapore. In yet other embodiments, the computing device 400 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 400 comprises a combination of devices, such as a mobile phone combined with a digital audio player or portable media player. In one of these embodiments, the computing device 100 is a device in the Google/Motorola line of combination digital audio players and mobile phones. In another of these embodiments, the computing device 400 is a device in the IPHONE smartphone line of devices manufactured by Apple Inc. In still another of these embodiments, the computing device 400 is a device executing the ANDROID open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 400 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex.

Having described certain embodiments of methods and systems for improving designs of electronic mail message templates, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for monitoring for and identifying variations in user interface designs and making recommendations for improving designs of electronic message templates based on identified variations, the method comprising:

importing, by a capture engine executing on a first computing device, an email template into an email client;

rendering, by the capture engine, the email template in the email client;

generating, by the capture engine, a screen shot of a portion of the rendered email template;

comparing, by a comparison engine executed by the first computing device, the generated screen shot with an archived screen shot of the rendered portion;

determining, by the comparison engine, that a first level of variation between the generated screen shot and the archived screen shot exceeds a first threshold level of variation;

transmitting, by an alert engine executed by the first computing device, to a second computing device, a notification of the first level of variation and a recommendation to modify the email template to minimize the first level of variation;

replacing, by the comparison engine, the archived screen shot of the rendered portion with the generated screen shot;

subsequent to replacing the archived screen shot with the generated screen shot, comparing, by the comparison engine, the replacement screen shot with a subsequently generated screen shot of the rendered portion of the email template rendered by the email client;

determining, by the comparison engine, that a second level of variation between the replacement screen shot and the subsequently generated screen shot exceeds the first threshold level of variation;

transmitting, by the alert engine, to the second computing device, a second notification of the second level of variation and a second recommendation to modify the email template to minimize the second level of variation; and replacing, by the comparison engine, the replacement screen shot with the subsequently generated screen shot.

2. The method of claim 1 further comprising receiving, before importing the email template, a request from the second computing device to monitor for variations in rendering of the email template by at least one email client.

3. The method of claim 1, wherein generating further comprises generating a screen shot of all portions of the rendered email template.

4. The method of claim 1, wherein comparing further comprises comparing a subset of a plurality of pixels in the generated screen shot with a subset of a plurality of pixels the archived screen shot.

5. The method of claim 1, wherein comparing further comprises performing a pixel-by-pixel comparison of the generated screen shot and the archived screen shot.

6. The method of claim 1 further comprising determining, by the comparison engine, the first level of variation based upon the comparing of the generated screen shot with the archived screen shot.

7. The method of claim 1 further comprising storing, in a log, an identification of the first level of variance.

8. The method of claim 1 further comprising storing, in a log, an identification of the transmitted notification.

9. The method of claim 1 further comprising storing the generated screen shot in a database of archived screen shots.

10. The method of claim 1 further comprising:
rendering, by the capture engine, in the email client, a HyperText Markup Language (HTML) document associated with the email template;
comparing the rendered HTML document with an archived HTML document associated with the email template;
determining, by the comparison engine, that a second level of variation between the rendered HTML document and the archived HTML document exceeds a second threshold level of variation; and
transmitting, by the alert engine, to the second computing device, a second notification of the level of variation and a second recommendation to modify the email template to minimize the level of variation.

\* \* \* \* \*

UNITED STATES PATENT AND TRADEMARK OFFICE
CERTIFICATE OF CORRECTION

| | |
|---|---|
| PATENT NO. | : 11,055,483 B2 |
| APPLICATION NO. | : 16/814194 |
| DATED | : July 6, 2021 |
| INVENTOR(S) | : Brindley et al. |

It is certified that error appears in the above-identified patent and that said Letters Patent is hereby corrected as shown below:

In the Drawings

In Sheet 8 of 8, FIG. 4C, for Tag "430a-n", delete "I/O Device" and insert -- I/O Devices --, therefor.

In the Specification

In Column 2, Line 27, delete "engine no," and insert -- engine 110, --, therefor.

In Column 5, Lines 38-39, delete "plurality of pixels the" and insert -- plurality of pixels in the --, therefor.

In Column 7, Line 40, delete "engine no" and insert -- engine 110 --, therefor.

In Column 9, Line 52, delete "FIG. 4" and insert -- FIG. 4A --, therefor.

In Column 10, Line 45, delete "Calif., the" and insert -- Calif., or the --, therefor.

In Column 11, Line 29, delete "memory 422" and insert -- memory unit 422 --, therefor.

In Column 11, Line 32, delete "main memory 422" and insert -- main memory unit 422 --, therefor.

In Column 11, Line 34, delete "main memory 422" and insert -- main memory unit 422 --, therefor.

In Column 11, Line 36, delete "processor 321" and insert -- processor 421 --, therefor.

In Column 11, Line 46, delete "MicroChannel Architecture (MCA)" and insert -- Micro Channel Architecture (MCA) --, therefor.

In Column 11, Line 48, delete "display 424," and insert -- display device 424, --, therefor.

Signed and Sealed this
Third Day of January, 2023

*Katherine Kelly Vidal*
Katherine Kelly Vidal
*Director of the United States Patent and Trademark Office*

CERTIFICATE OF CORRECTION (continued)
U.S. Pat. No. 11,055,483 B2

In Column 11, Line 50, delete "display 424." and insert -- display device 424. --, therefor.

In Column 11, Line 51, delete "computer 400" and insert -- computing device 400 --, therefor.

In the Claims

In Column 15, Lines 6-7, in Claim 4, delete "plurality of pixels the" and insert -- plurality of pixels in the --, therefor.